United States Patent [19]
Moore

[11] 3,830,130
[45] Aug. 20, 1974

[54] GUIDE FOR PORTABLE POWER SAWS

[76] Inventor: Harold E. Moore, 930-E. Candlewood Ave., Orange, Calif. 92667

[22] Filed: Dec. 8, 1971

[21] Appl. No.: 205,995

Related U.S. Application Data

[63] Continuation-in-part of Ser. No. 108,346, Jan. 21, 1971, abandoned.

[52] U.S. Cl.............. 83/745, 83/471.2, 83/477.1, 83/581
[51] Int. Cl....... B27b 9/04, B27b 27/02, B27b 5/18
[58] Field of Search....... 83/745, 743, 471.2, 471.3, 83/771, 523, 574, 581, 477.2, 477.1, 477

[56] References Cited
UNITED STATES PATENTS

| | | | |
|---|---|---|---|
| 2,627,287 | 2/1953 | McClusky | 83/574 |
| 2,709,463 | 5/1955 | Gustin | 83/477.2 |
| 2,773,523 | 12/1956 | Hopla | 83/745 |
| 3,320,982 | 5/1967 | Kwiatkowski | 83/574 |
| 3,586,077 | 6/1971 | Pease | 83/471.2 |

Primary Examiner—Donald R. Schran
Attorney, Agent, or Firm—Christie, Parker & Hale

[57] ABSTRACT

A guide apparatus suitable for use as straight edge and a guide for portable power and hand saws. The guide includes a receiver or holder, preferably approximating in length the length of the piece to be worked. A replaceable guide member adapted to be snap-fitted into the holder, preferably fabricated of an expendable material such as plastic, is also provided. When first put into use the replaceable guide member is cut along its saw blade edge so as to precisely fit it to the blade-shoe configuration of the specific power saw with which the apparatus is to be used. In a preferred embodiment the saw shoe and guide apparatus are each modified to provide a guide track configuration at the side of the shoe remote from the blade. Anchoring and clamping devices adapted to engage the holder along its length or at its ends for securing the apparatus in position on the piece to be worked are also included.

16 Claims, 7 Drawing Figures

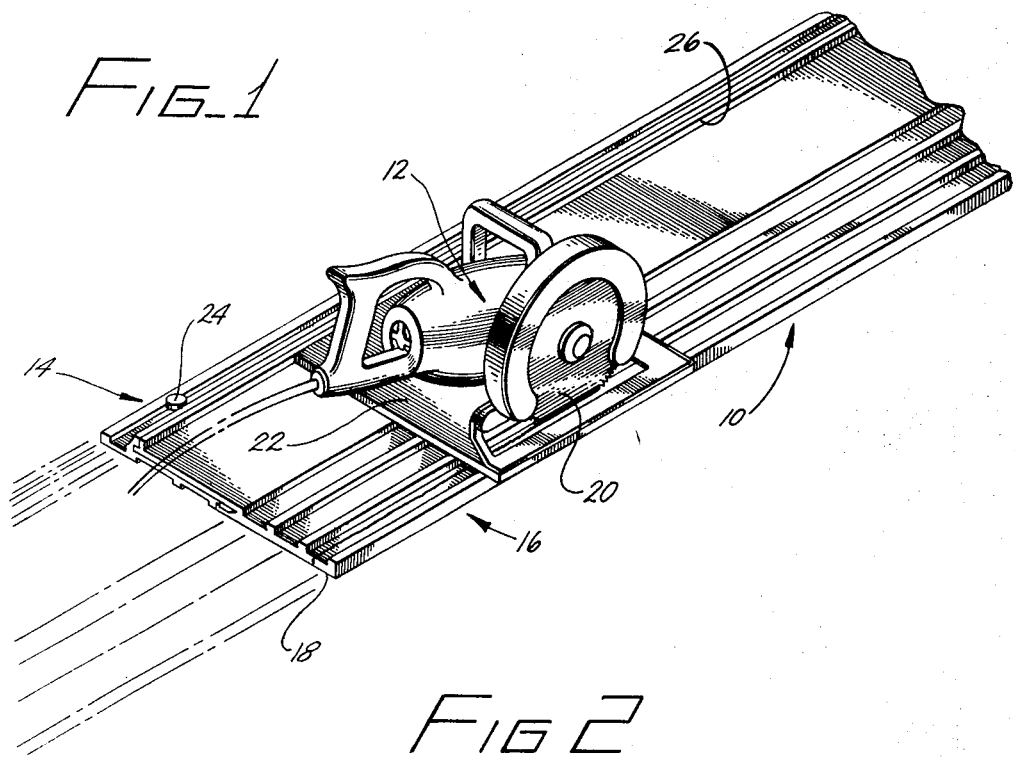
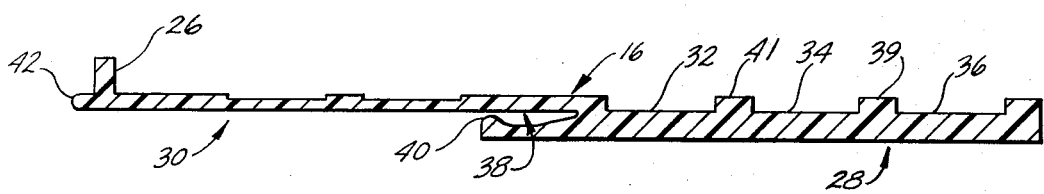
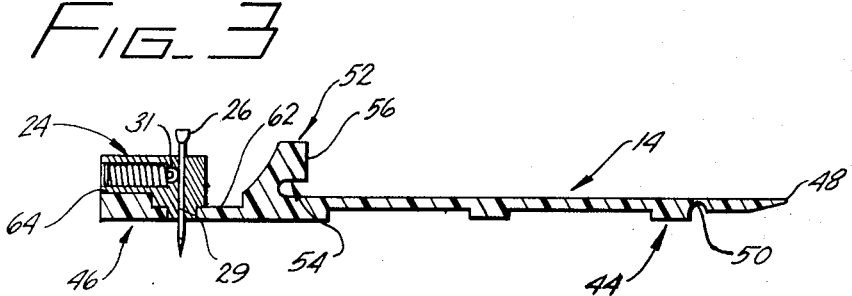

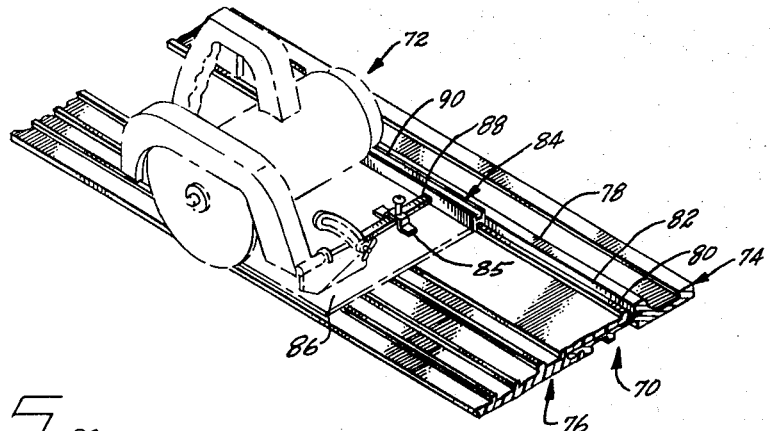
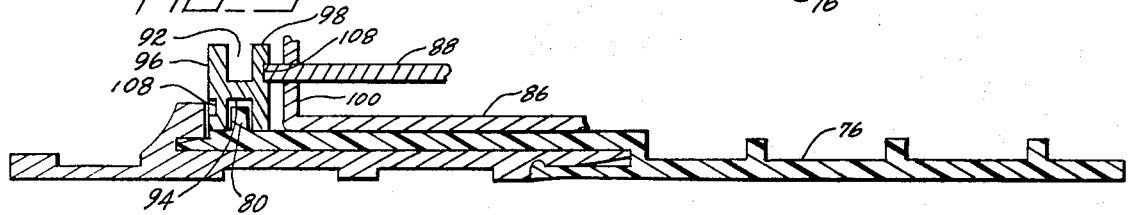
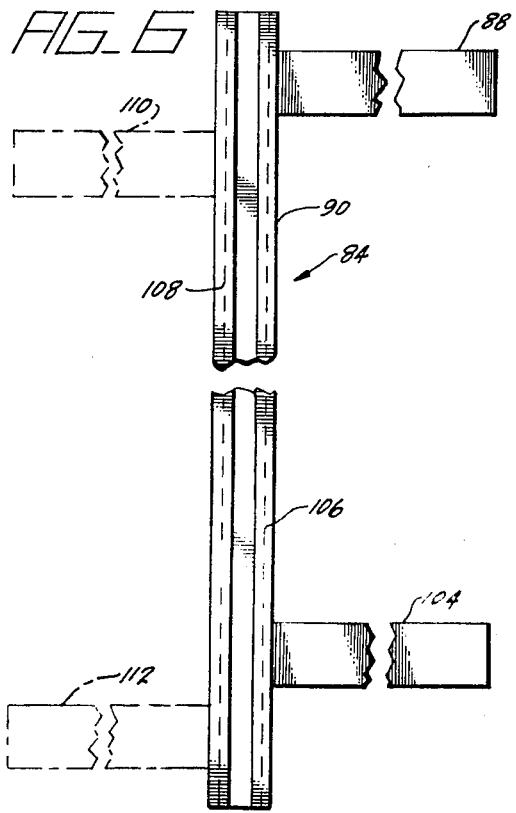

GUIDE FOR PORTABLE POWER SAWS

CROSS REFERENCE TO RELATED APPLICATION

This application is a continuation-in-part of application Ser. No. 108,346 filed Jan. 21, 1971 and now abandoned.

DESCRIPTION OF THE PRIOR ART

The present invention relates to straight edges and in particular to a combined straight edge and portable power saw guide.

The concept of providing a guide for use with portable power saws is exemplified by a number of devices such as those illustrated by U.S. Pat. Nos. 2,708,465 and 2,775,523. In general such guides have involved the provision of an auxiliary structure which is adapted to be positioned on and preferably anchored to a workpiece. By suitable measuring and positioning, the auxiliary structure is located on the workpiece such that portable power saw can be positioned with the edge of its saw shoe which is adjacent the blade bearing against the guide. The operator then brings the saw into operation, moves it relative to the guide and cuts the workpiece to which the guide is attached.

It has been characteristic of such prior art guides that one of several problems has been encountered in seeking to obtain satisfactory results. For example, a significant amount of premeasuring of the workpiece is necessary in order to locate the proper position and orientation of the guide to be clamped to the workpiece since in the prior art cases such guides, referred to as edge guides, did not lie on the cutting line. In addition, such guides were not interchangeable with all of the various types of portable saws available and hence the flexibility and usefulness of such guides was quite limited.

In the case of guides which are adapted to be clamped to workpieces there is the further problem that the positioning, clamping and removal of the guides, as well as the passage of the saw adjacent the guide while also in sliding contact on the workpiece creates opportunities for disturbing or marring the workpiece. This can be a significant factor especially in the use of a portable power saw with valuable hardwoods.

SUMMARY OF THE INVENTION

The present invention provides a guide for a portable power saw which avoids the problems inherent in prior art guides. According to one embodiment of the present invention there is provided a guide apparatus comprising an elongated receiver adapted to be supported on the surface of the workpiece to be cut, the receiver including an extension along the edge thereof nearest the blade of the handsaw. An elongated replaceable guide member, engageable with the receiver is also provided and adapted to be supported on the workpiece, the guide member having a blade guiding first portion and a receiver engaging second portion. The second portion further defines a saw shoe guide located on the side of the shoe remote from the saw blade.

In another embodiment the invention provides a guide apparatus for a power handsaw having a saw shoe which comprises an elongated guide member of a disposable material adapted to be supported on the workpiece. The guide member has a blade cutting first portion and a saw shoe engaging and guiding second portion with the saw shoe engaging and guiding second portion being located adjacent the side of the shoe remote from the saw blade. There is also provided means for clamping the guide member to a workpiece to be cut such that the blade guiding first portion of the member lies on the cutting line.

In a presently preferred embodiment, the guide apparatus for a power handsaw having a saw shoe comprising an elongated receiver including an extension along the edge thereof nearest the blade of the handsaw. An elongated replaceable guide member is engaged with the receiver, the guide member having a saw blade guiding first portion and a receiver engaging second portion. The second portion of the guide member defines a saw shoe guide surface and the engaged receiver and guide member cooperatively define a guide slot with both the guide surface and slot being located on the side of the shoe remote from the saw blade. A key member is attached to said saw shoe and arranged for sliding engagement in said guide slot.

In contrast with guides of the prior art, the guide of the present invention is adaptable to and useful with any of the various types of portable power saws. Because of its unique features it is particularly suited for fast and accurate cutting of any material ordinarily cut with such saws whether the material be wood, marble, plastic or other synthetic materials.

In its original uncut and unmodified state the replaceable and disposable guide member is provided with a width dimension sufficient to accommodate all known saw shoe width dimensions. Once purchased, the replaceable guide member is then specifically tailored to the user's particular type of saw by cutting off any excess material along a straight line at the blade edge of the replaceable guide member. After the excess material has been severed from the replaceable guide member, the user is now ready to lay the straight edge thereby defined exactly on the line which is to be cut on the workpiece without any pre-measuring. Once placed on the workpiece, the guide is clamped to the material to be cut or is tacked down by means of attachment devices particularly tailored for use with the guide according to the present invention. No pre-measuring is necessary. Because the saw now rides on top of the replaceable guide member, the workpiece need not be disturbed or marred during the guided saw operation.

In the presently preferred embodiment additional guiding of the saw is obtained by arranging the receiver and guide member such that a slot is located at the side of the saw shoe remote from the blade when the receiver and guide member are snap-fitted together and ready to be put in operation. The side of the saw shoe remote from the blade is then modified by having a guide member attached thereto or the entire shoe plate itself is modified to define the guide member at the specified location. In operation, the guide apparatus is properly positioned on the workpiece and the modified saw is placed on the guide apparatus such that the guide member engages in the slot. The guiding capability of the basic guide apparatus and the mating track or key-slot arrangement positively guards against the possibility of "loading" up the saw blade during operation, eliminating any "kick" during operation with possible resultant danger to the saw operator and also permits the saw to be backed up without binding.

In addition to an important, and as presently contemplated primary application of use with portable, rotary blade, power saws, other applications include use with power jig and saber saws as well as with the various types of handsaws. Because the blade guide edge and cutting line now coincide, cuts can now be made in large panels, etc. with no pre-measuring other than to provide the mark along which the cut is to be made. Because of its accuracy and resultant ease of operation of the power saw, it is expected that use of the guide apparatus of the present invention will result in elimination of panel and table saws particularly in "on the job" construction sites.

The use of the present invention now makes a portable saw even more versatile in that it can be used in such diverse applications as shaving door edges or cutting a panel in the middle along a precise and accurate straight line to permit adjoining piece to be flush butted against each other. Because the blade follows a straight line, the guide is safer. It can be used to make cuts in horizontal or vertical surfaces. Since the safety guard remains down at all times, the saw can be moved in either direction without binding. In typical commercial embodiments, the disposable guide member, as well as the more permanent receiver member, will be provided in 4 and 8 foot lengths.

DESCRIPTION OF THE DRAWINGS

The foregoing and other advantages of the present invention will be better understood by reference to the drawing wherein:

FIG. 1 is a perspective view of a portable power saw and the guide apparatus structure according to the present invention in its completely assembled condition;

FIG. 2 is a sectional view of the replaceable guide member;

FIG. 3 is a sectional view of the guide apparatus receiver and a guide apparatus securing device according to the present invention;

FIG. 4 is a perspective view of a saw and guide apparatus according to a presently preferred embodiment of the invention;

FIG. 5 is a sectional fragmented view of the guide apparatus incorporating the preferred mating track arrangement;

FIG. 6 is a plan view of a guide accessory to be attached to a saw shoe according to a preferred embodiment of the invention; and FIG. 7 is a sectional view of a saw shoe modified to provide the guide track function of the preferred embodiment.

DESCRIPTION OF A SPECIFIC EMBODIMENT:

A complete assembly of the guide apparatus 10 according to the present invention is shown in perspective view in FIG. 1, together with a typical portable power saw 12 in position on the assembly. As shown, the structure comprises a receiver or holder 14 engaging a replaceable guide member 16. As will be described in more detail in conjunction with the description of FIGS. 2 and 3, the holder 14 and guide 16 are formed in such a manner as to engage and interlock in the assembled configuration. By providing the holder of a rigid and permanent material such as aluminum and the guide member of a high impact material such as styrene, an inexpensive, simple, easily manipulable guide apparatus is provided for rotary power saws which is adaptable to saws of various sizes and the various types of materials which are to be cut by such saws. When equipped with a diamond blade, a saw and guide apparatus according to the present invention can be utilized to cut marble, masonry and other hard or abrasive materials.

In the embodiment shown in FIGS. 1 and 2, the replaceable guide member 16 is shown as it is initially obtained with an increment of material 18 extending beyond the edge of the blade 20 of the power saw to which it is to be fitted. Although it is contemplated that guide member 16 can be provided in one of several widths, in a preferred embodiment it is fabricated with a width dimension slightly in excess of the dimension of the widest shoe among the commercially available portable rotary power saws. After the acquisition the excess portion of the member 16 which extends beyond the saw blade is removed by the simple expedient of laying the assembly 10 on a shelf surface with the guide member 16 extending a predetermined distance beyond the edge thereof. The assembly is then held or secured in place, saw 12 is set on the assembled guide structure with the edge of its saw shoe remote from blade 20 bearing against a shoulder 26 on guide member 16. By energizing the saw and moving it forward using shoulder 26 as a guide, the excess portion 18 of the replaceable guide member is cut off, producing a saw guide and straight edge specifically tailored to the shoe dimension of the saw with which it is to be primarily used. The guide apparatus is now ready for use on workpieces to be cut and is put into use by placing the assembled receiver and guide member 10 on the work and laying it on the mark or line along which the work is to be cut.

Referring to FIG. 2, a cross-sectional elevational view of guide member 16 is depicted. As shown therein the guide member includes a blade guiding first portion 28 and a receiver engaging second portion 30. As previously indicated, the guide member 16 is an elongated, relatively narrow panel of a polymeric material such as polyvinyl chloride or high impact styrene. In FIG. 2 the guide member is shown having a series of detents 32, 34, 36 disposed at spaced intervals across the width of the blade guiding first portion 28. The detents are provided to reduce the amount of material in that portion of the guide member which is cut away before the guide apparatus is put into actual use. Adjacent pairs of detents define shoulders 38 and 40.

Once cut to order, blade guiding portion 28 is a section of material having a transverse or width dimension which, together with the corresponding dimension of the receiver engaging second portion measured to the edge of a shoulder 26, equals the corresponding saw shoe dimension. As shown portion 28 is arranged so as to be supported by the workpiece to be cut. Located at the edge of portion 28 remote from the blade guiding edge and approximately in the center of member 16 is a receiving aperture 38 which also extends along at least a substantial portion of the length thereof. Aperture 38 has a predetermined configuration adapted to receive an extension on receiver 14 and includes a lip 40 which engages a corresponding detent adjacent the edge of the extension on receiver 14 in a first tongue and groove-like configuration. The saw shoe guiding second portion 30 of guide member 16 comprises a relatively thin width of material located above and providing one of the defining surfaces of detent 38 which extends in a direction away from the blade edge and terminates in shoe guiding shoulder 26 and lip 42. Lip 42 and the side of shoulder 26 remote from the saw shoe are likewise adapted to engage with and to be positioned against a receiving aperture and abutting surface, respectively, on receiver 14 in a second tongue and groove-like configuration. Portion 30 is arranged so as to be supported partially by its integral connection with portion 28 and partially by receiver 14 when assembled therewith in the overlapping relationship shown in FIG. 1. When replacement of guide member 16 is desired, due to age or wear or when the guide apparatus is to be used with a differently dimensioned saw, the guide member 16 is disengaged from the receiver and a new member snapped into place.

Guide member receiver 14 is illustrated in elevational cross-sectional view in FIG. 3. As with the guide member, receiver 14 likewise has an elongated configuration approximately equal in length to the guide member and is fabricated of a strong, relatively rigid, material such as aluminum. Receiver 14 comprises an extension portion or section 44 for engaging the guide member and a shelf portion or section 46 whereby the assembly may be removably secured to a workpiece to be cut. Extension portion 44 is provided with a projection 48 along the edge thereof having a mating outline adapted to fit within and lockingly engage in aperture 38 with a detent 50 engaging lip 40 on guide member 16. Shelf portion 46 is likewise provided with a shoulder 52 defining an aperture 54 for receiving lip 42 on member 16 with the surface 56 being disposed so as to abut against the side of shoulder 26 on member 16 remote from the saw shoe. The extension portion 44 of receiver 16 is generally coextensive in width with shoe guiding portion 30 on member 16 to provide the overlapping configuration. Receiver 14 is provided with a ribbed bottom surface 58 which is then placed on and supported by the workpiece to be cut. Receiver 14 and likewise the entire guide apparatus when the two parts of the apparatus are assembled are secured rigidly in position on the workpiece by various clamping or holding devices to be described immediately below.

A tacking device 24 is shown in position on shelf portion 46 in FIGS. 1 and 3 and illustrates in greater detail how the assembly is secured to a workpiece in one particular embodiment. As shown, securing device 24 is a cylindrical element such as aluminum having a fastener 26 friction fitted in an aperture 28 within device 24 such that it can be driven through an aligned aperture in receiver 14 and into a workpiece to which the guide apparatus is to be secured. Other means of securing the assembly to a workpiece such as C clamps are also contemplated, particularly in situations where it is undesirable to drive nails or other fasteners into the workpiece.

In one embodiment securing device 24 is a separate element having a stepped configuration on its bottom side such that a portion thereof rests in a channel 62 on shelf portion 46 and the remaining portion thereof on a shoulder 64. Fastener 26 is a nail held in aperture 28 by a spring loaded ball situated interiorly of device 24 and adjacent aperture 28 such that it bears against nail 26 as it passes through the aperture and holds it in position in device 24 preventing its loss when device 24 is not in use. In an alternate embodiment device 24 is formed integrally with and incorporated into shelf portion 46. In this embodiment the shelf portion is laterally countersunk to receive the fastener retaining spring and biased ball arrangement. A sufficient number of securing devices are located along the length of receiver 14 to assure stationary maintenance of the guide apparatus in position during cutting operations.

In still another embodiment channel 62 is drilled at specified intervals along its length with a predetermined number of small holes of a diameter such as 0.1 inch. Holes of this dimension are suited for receiving twopenny nails which are driven therethrough into the material to which the guide is to be secured prior to operation of the saw.

A presently preferred embodiment of the present invention is illustrated in FIG. 4, a perspective view of a guide apparatus 70 in assembled form, a power saw 72 shown in ghosted relationship and a two element track arrangement, formed by cooperating elements on the guide apparatus and the saw shoe. As shown in FIG. 4, a receiver 74 of a material such as aluminum is engaged by means of a snap fit with a guide member 76 of a material such as high impact styrene. The guide member 74 is provided with a ridge member 78 extending the length thereof, and the guide member is provided with a similar ridge member 80 spaced from member 78 to define a slot 82 between the two ridge members. The two guide members 76, 78 and included slot 82 together define a first track element.

The power saw 72 is likewise modified from the configuration illustrated in FIG. 1 and is provided with a guide accessory 84 which is attached to the shoe 86 of the power saw by clamping or spot welding one or more arms 88 extending transversely of the body portion 90 of accessory 84. Body portion 90 of the guide accessory, as shown in FIG. 4 and illustrated in still greater detail in FIG. 5 has the configuration of the letter "H" in crosssection thereby defining an upper and a lower slot centrally located of the body portion 90 and extending longitudinally thereof. The lower vertical portions together with the crossbar portion of the "H" configuration define a second track element adapted to mate with and slidingly engage with the first track element on the guide apparatus 70. Similarly the upper verticals and cross-bar of the "H" define a second possible alternative track element.

As shown in FIG. 5, slot 94 in accessory 84 is disposed over guide member 76 such that ridge 80 extends into slot 94. Likewise vertical member 96 of body portion 90 extends into slot 82 thereby providing a mutually cooperating track or key and slot guiding arrangement of the presently preferred embodiment. As shown in FIG. 5, arm 88 extends transversely away from the second vertical member 98 of the H-shaped guide accessory and passes through an eye provided in the vertical wall 100 running along the edge of the sole or plate 86 of the saw shoe. Arm 88 is secured to plate 86 in one of several suitable ways, including bolting or clamping by means of bracket 85 as shown in FIG. 4.

A plan view of the guide accessory 84 of the present invention is shown in FIG. 6. Extending from one side of the body portion 90 of the accessory is a first and second arm 88 and 104. Arms 88 and 104 nest in a slot 106 running the entire length of the body portion 90 and when positioned in the desired location in slot 106, are spot welded therein. As can be seen from FIG. 5, slot 106 has a higher elevation than slot 108 which is located on the opposite side of the body portion. The different elevation of the two slots 106 and 108 makes the use of the guide accessory of the presently preferred embodiment universal with respect to the various saw shoe configurations. That is, it can be used with saw shoes of the type illustrated in FIG. 5 which have an upturned wall or edge located along the side of the sole plate or it can be used with saws having a completely flat configuration. In the former saw shoe type, one or more eyelets or slots (which can be drilled if necessary) are provided in wall 100 for receiving the arms 88, 104 of the guide accessory. In the latter saw shoe configuration the lower slot elevation or body portion 90 such as the elevation of slot 108 is needed so as to permit the arms of the guide accessory to overlie and contact the upper surface of the shoe. Thus, using the embodiment of FIG. 6 as illustrative, arms 110 and 112 are welded into the lower slot 108 and the orientation of the guide key accessory rotated 180° such that arms 110 and 112 can be spot welded to the upper side of the sole plate of the saw shoe.

Finally, as shown in the schematic representation in FIG. 7, the sole plate 114 of the saw shoe can itself be modified such that the edge thereof, remote from the saw blade 116, is provided with a channel shaped extremity 118 which defines a slot 120 and a key member 122 suitable for mating engagement with a slot and ridge such as slot 82 and ridge 80 of the guide apparatus 70 in FIG. 4. From the foregoing it can be seen that a number of physical configurations for providing first and second mating, slidably engaged track elements are possible including the provision of a slot on either the saw shoe or the guide apparatus and the provision of a key element engageable in the slot on the opposite member of saw shoe-guide apparatus combination. Similarly, the first track element can be provided by means of an accessory attached to the saw shoe as in FIGS. 4, 5 and 6 or it can be built into the shoe as in FIG. 7. It is the foregoing and similar structural variations that are contemplated by the presently preferred embodiment and the use of the first and second mating track element nomenclature.

What is claimed is:

1. A guide apparatus for a power handsaw having a saw shoe comprising:
   an elongated receiver including an extension along the edge thereof nearest the blade of the handsaw; and
   an elongated replaceable guide member engaged with the receiver having a blade guiding first portion and a receiver engaging second portion, said second portion defining a saw shoe guide located on the side of the shoe remote from the blade, the receiver extension and guide member second portion defining mating tongue and groove portions engaged in an overlapping relationship.

2. A guide apparatus according to claim 1 wherein said groove portion is an elongated recess located on the guide member on the side thereof adjacent the workpiece and intermediate the blade guiding portion and the saw shoe guide, said recess having an interlocking configuration with respect to the tongue portion of the receiver extension whereby the receiver and the guide member are lockingly engaged when brought together.

3. A guide apparatus according to claim 2 wherein the guide member includes a removable section in the blade guiding portion thereof for tailoring the guide member to the specific shoe dimensions of the saw with which the apparatus is to be used.

4. A guide apparatus according to claim 1 wherein the receiver includes a shoulder and adjacent channel located along the edge thereof remote from the blade of the saw.

5. A guide apparatus according to claim 4 including means for securing the holder to the workpiece to be cut.

6. The guide apparatus of claim 7 wherein the securing means is an auxiliary fastener having a mating configuration with relation to the shoulder and channel on the receiver, said fastener having a nail frictionally held in an aperture in the fastener and located on the receiver in alignment with an aperture in the receiver whereby the nail can be driven into the workpiece.

7. The guide apparatus of claim 5 wherein the securing means is an integral part of the receiver, the securing means including a nail frictionally held in an aperture passing through the receiver.

8. The guide apparatus of claim 5 wherein the securing means is a clamp engageable with the guide apparatus and workpiece.

9. A guide apparatus for a power handsaw having a saw shoe comprising:
   an elongated receiver including an extension along the side thereof nearest the blade of the handsaw;
   an elongated replaceable guide member engaged with the receiver, the guide member having a saw blade guiding first portion and a receiver engaging second portion, the receiver and guide member second portion defining a first track element located on the side of the shoe remote from the saw blade; and
   a second mating track element attached to said saw shoe and arranged for sliding engagement with first track element.

10. A guide apparatus according to claim 9 wherein said first track element comprises a first surface in the receiver and a second surface on the guide member, both of said surfaces being perpendicular to the plane of the guide apparatus and being closely spaced relative to one another to define a slot therebetween extending longitudinally of the receiver and guide member.

11. A guide apparatus according to claim 10 wherein said second track element is a key element extending longitudinally of the saw shoe and arranged to engage in the slot.

12. A guide apparatus according to claim 11 wherein said key element is an accessory attached to the saw shoe.

13. A guide apparatus according to claim 11 wherein said key element is formed along and integral with the side of the saw shoe remote from the saw blade.

14. A guide apparatus according to claim 9 wherein said first track element is a key element extending longitudinally of the receiver and guide element.

15. A guide apparatus according to claim 14 wherein said second track element is a slot extending longitudinally of the saw shoe and arranged to engage with the key element.

16. A guide apparatus for a power saw having a saw shoe comprising:

an elongated receiver including a support portion extending in the direction of elongation located along the side thereof nearest the blade of the power saw; and an elongated replaceable guide member engaged with the receiver and the support portion, the guide member having a saw blade guiding first portion and a receiver engaging second portion, the guide apparatus defining a track element located on the side of the apparatus and the shoe remote from the saw blade; said track element being adapted for cooperative engagement with a mating element attached to the saw shoe of the power saw with which the guide apparatus is used.

* * * * *